(12) United States Patent
Amjadi (10) Patent No.: US 8,219,651 B2
(45) Date of Patent: *Jul. 10, 2012

(54) INCENTIVE NETWORK FOR DISTRIBUTING INCENTIVES ON A NETWORK-WIDE BASIS AND FOR PERMITTING USER ACCESS TO INDIVIDUAL INCENTIVES FROM A PLURALITY OF NETWORK SERVERS

(75) Inventor: Kamran Amjadi, Bethesda, MD (US)

(73) Assignee: Catalina Marketing Corporation, St. Petersburg, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/160,753

(22) Filed: Jun. 15, 2011

(65) Prior Publication Data

US 2011/0288926 A1 Nov. 24, 2011

Related U.S. Application Data

(63) Continuation of application No. 11/056,167, filed on Feb. 14, 2005, now abandoned, which is a continuation of application No. 09/251,480, filed on Feb. 17, 1999, now Pat. No. 7,958,224.

(51) Int. Cl.
*G06F 15/16* (2006.01)
(52) U.S. Cl. .......................... 709/220; 709/224; 709/228
(58) Field of Classification Search .................. 709/220, 709/224, 228; 370/485
See application file for complete search history.

(56) References Cited

U.S. PATENT DOCUMENTS

| | | | |
|---|---|---|---|
| 3,573,747 A | 4/1971 | Adams et al. | |
| 3,688,276 A | 8/1972 | Quinn | |
| 3,719,927 A | 3/1973 | Michels et al. | |

(Continued)

FOREIGN PATENT DOCUMENTS

| | | |
|---|---|---|
| EP | 0512413 | 11/1992 |
| EP | 0 986 016 | 12/2001 |
| GB | 1 489 572 | 10/1977 |
| JP | 60-3783 | 1/1985 |
| WO | WO 9427231 | 11/1994 |
| WO | WO 97/05555 | 2/1997 |
| WO | WO 97/23838 | 7/1997 |
| WO | WO 97/30410 | 8/1997 |
| WO | WO 98/34189 | 8/1998 |
| WO | WO 98/58334 | 12/1998 |

OTHER PUBLICATIONS

ESR dated Jul. 25, 2007 in application EP 07008224.3.

(Continued)

*Primary Examiner* — Khanh Dinh
(74) *Attorney, Agent, or Firm* — Pillsbury Winthrop Shaw Pittman LLP (57) ABSTRACT

An incentive network equipped with methods for distributing incentives on a network-wide basis and for permitting user access to individual incentives from any network server. In accordance with one aspect of the invention, a method performed by a server for accessing incentives in an network, comprises steps of receiving an access request from a device associated with a user and connected to the network, transmitting identifying information corresponding to the access request to a host, receiving incentive information from the host reflecting available incentives corresponding to the identifying information, and transmitting a network document, including the incentive information, to the device associated with the user in response to the access request. In accordance with another aspect of the present invention, a computer-implemented method for accessing incentives in an network, comprises transmitting an access request to access a server in the network, receiving a subscriber request for a subscriber ID associated with the access request, transmitting the subscriber ID to the server, and receiving in response to the access request incentive information reflecting available incentives corresponding to the subscriber ID, wherein the server provides the subscriber ID to a host that selects and transmits the incentive information to the server.

59 Claims, 8 Drawing Sheets

U.S. PATENT DOCUMENTS

| | | |
|---|---|---|
| 4,186,438 A | 1/1980 | Benson et al. |
| 4,321,672 A | 3/1982 | Braun et al. |
| 4,346,442 A | 8/1982 | Musmanno |
| 4,376,978 A | 3/1983 | Musmanno |
| 4,449,186 A | 5/1984 | Kelly et al. |
| 4,630,201 A | 12/1986 | White |
| 4,674,044 A | 6/1987 | Kalmus et al. |
| 4,675,815 A | 6/1987 | Kuroki et al. |
| 4,677,552 A | 6/1987 | Sibley, Jr. |
| 4,689,478 A | 8/1987 | Hale et al. |
| 4,694,397 A | 9/1987 | Grant et al. |
| 4,734,858 A | 3/1988 | Schlafly |
| 4,745,468 A | 5/1988 | Von Kohorn |
| 4,752,675 A | 6/1988 | Zetmeir |
| 4,755,940 A | 7/1988 | Brachtl et al. |
| 4,774,662 A | 9/1988 | Ito et al. |
| 4,791,281 A | 12/1988 | Johnsen et al. |
| 4,872,113 A | 10/1989 | Dinerstein |
| 4,876,592 A | 10/1989 | Von Kohorn |
| 4,882,675 A | 11/1989 | Nichtberger et al. |
| 4,926,255 A | 5/1990 | Von Kohorn |
| 4,949,256 A | 8/1990 | Humble |
| 5,034,807 A | 7/1991 | Von Kohorn |
| 5,057,915 A | 10/1991 | Von Kohorn |
| 5,117,355 A | 5/1992 | McCarthy |
| 5,128,752 A | 7/1992 | Von Kohorn |
| 5,185,695 A | 2/1993 | Pruchnicki |
| 5,193,056 A | 3/1993 | Boes |
| 5,202,826 A | 4/1993 | McCarthy |
| 5,227,874 A | 7/1993 | Von Kohorn |
| 5,245,533 A | 9/1993 | Marshall |
| 5,249,044 A | 9/1993 | Von Kohorn |
| 5,283,734 A | 2/1994 | Von Kohorn |
| 5,287,181 A | 2/1994 | Holman |
| 5,287,268 A | 2/1994 | McCarthy |
| 5,305,195 A | 4/1994 | Murphy |
| 5,305,197 A | 4/1994 | Axler et al. |
| 5,353,218 A | 10/1994 | De Lapa et al. |
| 5,368,129 A | 11/1994 | Von Kohorn |
| 5,380,991 A | 1/1995 | Valencia et al. |
| RE34,915 E | 4/1995 | Nichtberger et al. |
| 5,420,606 A | 5/1995 | Begum et al. |
| 5,459,306 A | 10/1995 | Stein et al. |
| 5,502,636 A | 3/1996 | Clarke |
| 5,515,098 A | 5/1996 | Carles |
| 5,528,490 A | 6/1996 | Hill ............................... 364/403 |
| 5,557,518 A | 9/1996 | Rosen |
| 5,557,721 A | 9/1996 | Fite et al. |
| 5,604,542 A | 2/1997 | Dedrick ........................ 348/552 |
| 5,612,868 A | 3/1997 | Off et al. |
| 5,642,419 A | 6/1997 | Rosen |
| 5,642,484 A | 6/1997 | Harrison, III et al. |
| 5,644,723 A | 7/1997 | Deaton et al. |
| 5,697,844 A | 12/1997 | Von Kohorn |
| 5,710,886 A | 1/1998 | Christensen et al. |
| 5,710,887 A | 1/1998 | Chelliah et al. |
| 5,713,795 A | 2/1998 | Kohorn |
| 5,724,521 A | 3/1998 | Dedrick |
| 5,754,938 A | 5/1998 | Herz et al. |
| 5,758,257 A | 5/1998 | Herz et al. |
| 5,761,648 A | 6/1998 | Golden et al. .................. 705/14 |
| 5,765,138 A | 6/1998 | Aycock et al. ..................... 705/7 |
| 5,774,868 A | 6/1998 | Cragun et al. |
| 5,791,991 A | 8/1998 | Small |
| 5,794,210 A | 8/1998 | Goldhaber et al. |
| 5,796,393 A | 8/1998 | MacNaughton .............. 345/329 |
| 5,806,044 A | 9/1998 | Powell |
| 5,812,865 A | 9/1998 | Theimer et al. ............... 709/201 |
| 5,845,259 A | 12/1998 | West et al. ...................... 705/14 |
| 5,855,007 A | 12/1998 | Jovicic et al. |
| 5,907,830 A | 5/1999 | Engel et al. ..................... 705/14 |
| 5,949,875 A * | 9/1999 | Walker et al. .................. 702/78 |
| 5,970,469 A | 10/1999 | Scroggie et al. ................ 705/14 |
| 5,970,769 A * | 10/1999 | Lipari ............................ 72/131 |
| 5,999,932 A | 12/1999 | Paul ............................... 707/10 |
| 6,009,410 A | 12/1999 | LeMole et al. ................. 705/14 |
| 6,012,038 A | 1/2000 | Powell et al. |
| 6,018,726 A | 1/2000 | Tsumura ....................... 705/412 |
| 6,020,884 A | 2/2000 | MacNaughton .............. 345/329 |
| 6,035,280 A | 3/2000 | Christensen .................... 705/14 |
| 6,047,067 A | 4/2000 | Rosen |
| 6,052,709 A | 4/2000 | Paul ............................. 709/202 |
| 6,055,573 A | 4/2000 | Gardenswartz et al. ....... 709/224 |
| 6,075,971 A | 6/2000 | Williams et al. ............... 455/5.1 |
| 6,076,069 A | 6/2000 | Laor ............................... 705/14 |
| 6,101,487 A * | 8/2000 | Yeung ........................... 705/410 |
| 6,175,229 B1 | 1/2001 | Becker et al. ................. 324/117 |
| 6,301,471 B1 * | 10/2001 | Dahm et al. .................. 455/405 |
| 6,321,208 B1 | 11/2001 | Barnett et al. .................. 705/14 |
| 6,321,221 B1 * | 11/2001 | Bieganski ..................... 705/26.7 |
| 6,336,095 B1 | 1/2002 | Rosen ............................... 705/1 |
| 6,336,099 B1 | 1/2002 | Barnett et al. .................. 705/14 |
| 6,343,284 B1 | 1/2002 | Ishikawa et al. ............... 705/67 |
| 6,385,602 B1 | 5/2002 | Tso et al. .......................... 707/3 |
| 6,493,110 B1 | 12/2002 | Roberts .......................... 358/1.2 |
| 6,542,927 B2 | 4/2003 | Rhoads ......................... 709/217 |
| 6,556,991 B1 | 4/2003 | Borkovsky ........................ 707/6 |
| 7,002,995 B2 * | 2/2006 | Chow et al. ................... 370/485 |
| 7,028,187 B1 | 4/2006 | Rosen ........................... 713/175 |
| 7,231,469 B2 | 6/2007 | Hosoya et al. |
| 7,367,500 B2 | 5/2008 | Fajkowski |
| 7,958,224 B2 | 6/2011 | Amjadi ......................... 709/224 |
| 2003/0083931 A1 | 5/2003 | Lang ............................... 705/14 |
| 2003/0139969 A1 | 7/2003 | Scroggie et al. |
| 2004/0230485 A1 | 11/2004 | Barnett et al. |

OTHER PUBLICATIONS

Aug. 22, 2008, Pending claims for U.S. Appl. No. 08/873,974.
Aug. 22, 2008, Appeal brief for U.S. Appl. No. 08/873,974.
Specification for U.S. Appl. No. 09/505,632.
Pending Claims for U.S. Appl. No. 09/505,632.
Appeal Brief for U.S. Appl. No. 09/505,632.
Summons to attend oral hearings dated Jul. 30, 2010 in related case EP 00910224.5, filed Feb. 16, 2000.
May 1, 1996, Kohda et al., "Ubiquitous advertising on the WWW: Merging advertisement on the browser", Computer Networks and ISDN Systems 28 (1996) 1493-1499.
"Coupons Online", Electronic Marketing, Ltd., 1994.
"Interactive Online Targeted Coupon Delivery", Coupons Online.
"The Power of Targeted Marketing at Mass Media Rates", Coupons Online.
"Household Targeted Fraud Resistant Coupon Delivery via Online Services and the Internet", Coupons Online.
"Lever First Major Player Into On-line Couponing", *Brandweek*, Sep. 4, 1995.
"Coupons Go Digital", *Incentive*, Sep. 1995.
"Coupons", *U.S. News & World Report*, Sep. 18, 1995; The New York Times, Sep. 11, 1995.
"Muzak® Joins with Coupons Online for Interactive Marketing Program", Press Release, Sep. 5, 1995.
"Coupon Management Program Secure Encryption Techniques", Coupons Online, with advertisement from The New York Times Business Section, Jun. 21, 1995.
"Delivery of a Fraud Proof Coupon Online", Coupons Online.
"Cents-off Online", *Food & Beverage Marketing*, Sep. 1995.
"Savings in Cyberspace", *Marketing Tools*, Oct. 1995.
"Program Information", Coupons Online.
"Investigation and Prosecution of Manufacturers' Cents-Off Coupon Frauds", Coupon Fraud Prevention Task Force, 1992.
Patent Abstracts of Japan English Translation of Application No. 10-265433.
"Viewdata and the Information Society," Prentice-Hall, Inc., Englewood Cliffs, N.J., Chapters 1, 5, 8, 9, 21.
Berry, L.M., "Electronic Marketing: No Walls in This Mall," Direct Marketing, vol. 49, Issue 2, Jun. 1986, pp. 40-44, 71.
"Consumers Plugging Into New Electronic Mall," Advertising Age, Mar. 4, 1985.
"Electronic In-Home Shopping: 'Our Stores Are Always Open,'" Chain Store Age Executive, Mar. 1985, pp. 111-116.
Russell, John F., "Why Not Walk to Your Distributor's," Purchasing, Mar. 14, 1985, pp. 68A30-68A37.

"Rebirth of a Salesman: Willy Loman Goes Electronic," Business Week, Feb. 27, 1984, pp. 103-104.

"Would You Buy a Car from This Computer?" Business Week, Dec. 17, 1984, pp. 93-97.

"How a Fujitsu Communications System Keeps Mrs. Murata Off the Streets at Night," Business Week, Dec. 3, 1984.

Stundza, Tom, "Alcoa: Taking the Next Step to Computerized Purchasing," Purchasing, Mar. 27, 1986, pp. 124B3-124B5.

Morgan, James P., "A Good Computer Program Should Fit the Users," Purchasing, Nov. 20, 1986, pp. 46-48.

"Compressing Distribution into a Network," Modern Office Technology, Apr. 1986, pp. 108-112.

"Software for Purchasing," Purchasing, Sep. 12, 1985, pp. 93-95.

Tydeman, John, et al., "Teletext and Videotex in the United States," Data Communications, McGraw-Hill Publications Company, Chapter 4: "Current State of Teletext and Videotex in the United States."

Clarke, K.E., "Videotex Display Technology: The Immediate Past and the Likely Future," The Radio and Electronic Engineer, vol. 52, No. 2, Feb. 1982, pp. 59-66.

Booth, P.J., The Evolution of Videotex New Directions, Paper Presented to Swiss Videotex 84, Basel, Switzerland, Sep. 1984.

Electronic Technology, "Videotex Decoder and Microcomputer."

Gaujard, Pierre, Videotex 1980: State of the Art France, inside Videotex, Proceedings, A Seminar Held Mar. 13-14, 1980, pp. 26-42.

"Electronic Data Interchange—The Link to Business Connections," Section 1, Electronic Data Interchange, pp. 1-13.

Electrical Industry. Applications, the Electronic Data Interchange Association, vol. III, Mar. 14, 1985, pp. II-1-II-15.

Dreyfuss, Joel, "Networking: Japan's Latest Computer Craze," Fortune, Jul. 7, 1986, pp. 95-96.

"Local Services on the Internet: Structure, Players, Prospects," A White Paper based on "Redefining Local Services," a strategic research report to be published by Find/SVP in Apr. 1997, Arlen Communications, Inc., Peter Krasilovsky, Vice President, Feb. 1997.

Moskowitz, Lisa, "Emagine This: Useful Online Advertising," PC World, Nov. 18, 1997.

Li-Ron, Yael, "Sign Up for Online Shopping Incentives," PC World, Dec. 11, 1997.

Guglielmo, Connie, "Emaginet to Deliver One-To-One Web Marketing," Interactive Week, Dec. 10, 1997.

Lemos, Robert, "How to Market Via E-Mail Without the Spam," ZDNN, Jun. 3, 1997.

"Emaginet Plans to 'Push' Its Way Into Consumer Mindset, Pocketbook," Interative PR and Marketing New, 1997.

Piquet, Lori, "A Penny for Your Patrons," Internet Computing, Sep. 1998, vol. 3, Issue 9.

Georgia, Bonny L, "Score Free Stuff Online," Family PC, Dec. 1998, pp. 59-60.

Magil, Ken, E-centives Offer Pinpoint Targeting, But Will Consumers Jump Onboard?, DM News, vol. 19, No. 48, Dec. 22, 1997.

"Trust Internet Privacy Study: Summary of Market Survey Results," The Boston Consulting Group, Mar. 12, 1997.

Guglielno, Connie, "Emaginet to Deliver One-To-One Web Marketing," Interactive Week Online, Dec. 10, 1997.

Green, Heather, "A Little Net Privacy, Please," BusinessWeek, Mar. 16, 1998.

Bournellis, Cynthia, "Internet '95: The Internet's Phenomenal Growth is Mirrored in Startling Statistics," Internet World, vol. 6, No. 11, Nov. 1995, pp. 47-52.

Rieck, Dean, "Thirteen Unlucky Mistakes in Software Mail Order Sales and How to Avoid Them," Direct Marketing, Jun. 1996, pp. 52-55.

Fried-Cassorla, Albert, "Successful Marketing on the Internet: A User's Guide," Direct Marketing, Feb. 1995, pp. 23-26.

Fried-Cassorla, Albert, "Successful Marketing on the Internet: A User's Guide," Direct Marketing, Mar. 1995, pp. 39-42.

Margolis, Budd, "Digital Commerce: The Future of Retailing," Direct Marketing, Jan. 1996, pp. 41-46.

Rosenfield, James R., "Whither Database Marketing?" Direct Marketing, Jul. 1996, pp. 39-41.

"The Shape of Things to Come," Direct Marketing, Mar. 14, 1996, pp. XIX-XX1.

Lyons, Daniel, "Lack of Hard Numbers Fails to Deter Stampede to the Web," Infoworld, Nov. 6, 1995, pp. 63-66.

Leinfuss, Emily, "Adapt or Die: Internet Standards May Always Be in Flux," Infoworld, Nov. 6, 1995, pp. 61, 66.

Dellecave, Tom, "The Net Effect," SMT, Mar. 1996, pp. 17-21.

Gelomnine, Vince, "Selling in Cyberspace," Selling Success, May 1995, pp. 61-68.

Miller, Cyndee, "Marketing Industry Report: Consumder Marketers Spend Most of Their Money on Communications," Marketing news, vol. 30, No. 6, pp. 1, 5, Mar. 11, 1996.

Loro, Laura, "Mail Favorite Tool in Direct Marketing. Circles," Outfront Marketing, Jun. 1996.

"TV or PC?" Interactive Consumers, vol. 2, No. 2, Feb. 1995, pp. 1-7.

Pasher, Victoria Sonshine, "Agents' Internet Marketing Interest Exploding," National Underwriter, Jun. 24, 1996. pp. 9, 25.

"Watch Out: You Just Might Get an Offer from Junk E-Mailers You Can Refuse," Infoworld, Jul. 15, 1996, p. 66.

"Direct Sellers Ready for Cyberspace," Direct Marketing, May 1996, p. 6, 9.

"Study Suggests Surfers Prefer 'Exclusive' Info," Direct Marketing, Jun. 1996, p. 9.

Loro, Laura, "Online Needs Nimble Direct Marketing Skill," Business Marketing, Jun. 1996, pp. 1, 25.

MacKain, Lorrie, "Learning About Lists," Marketing Tools, Jun. 1996, pp. 14, 16-19.

Andelman, David A., "Betting on the 'Net," Marketing, Jun. 1995, pp. 47-59.

Cross, Richard and Smith, Janet, "Internet Marketing That Works for Customers," Direct Marketing, Aug. 1995, pp. 22-23, 51.

Anthes, Gary H., "Egad, More Junk E-Mail,"Computerworld, Dec. 19, 1994, p. 49.

MacDonald, Peter, "The Next 750 Words are Commercial-Free," Canadian Business, Jun. 1995, p. 155.

Watt, Peggy, "Internet Provider UUNET Expands Service Options," Network World, Jan. 15, 1996, p. 33.

Ouelette, Tim and Betts, Mitch, "Junk Mail Extends Its Reach," Computerworld, Nov. 6, 1995, p. 32.

King, Julia, "Client/Server Vendors Use Internet as Selling Tool," Computerworld, Nov. 13, 1995, p. 79.

Fitzgerald, Michael, "Internet Data Collector Bows," Computerworld, Nov. 6, 1995, p. 12.

Kagan, Jeffrey, "Jump on the Net Now," Success, Dec. 1995, p. 46.

Associated Press, "GM Hopes to be Leader in Internet Marketing," Mar. 11, 1996, p. 22.

Lewis, Herschel Gordon, "Cruisin' Down the 'Hype-er Space' Road: How to Write Copy for the (Gulp) Internet," Direct Marketing, Dec. 1995, pp. 14-15.

"Law and Order in Cyberspace?" Business Week, Dec. 4, 1995, pp. 44.

Gilbert, Evelyn, "Internet Gives Marketers Instant Access to Millions," National Underwriter, Jul. 10, 1995, pp. 13-14.

Wood, Douglas J. and Goldstein, Linda A., "Rules of the Road," Marketing Tools, Nov./Dec. 1995, pp. 22-27.

Mullich, Joe, "Web Sales Opportunities, Dangers Abound," Apr. 1995.

"The 'Click Here' Economy," Business Week, Jun. 22, 1998, pp. 122-128.

Coy, Peter, "You Ain't Seen Nothin' Yet," Business Week, Jun. 22, 1998, pp. 130-138.

"Leapfrogging a Few Links," Business Week, Jun. 22, 1998, pp. 141-142.

"Instant Info Is Not Enough," Business Week, Jun. 22, 1998, pp. 144.

"Rebirth of the Salesman," Business Week, Jun. 22, 1998, pp. 146-147.

"How Safe Is the Net," Business Week, Jun. 22, 1998, pp. 148, 152.

"In business today, it's not just about winning . . . It's about winning everyday," Intellution, www.intellution.com.

"Cyberspace Winners: How They Did It," Business Week, Jun. 22, 1998, pp. 154-160.

"So Where Are All the Bargains?" Business Week, Jun. 22, 1998, pp. 162-164.

Gross, Neil, and Sager, Ira, "Caution Signs Along the Road," Business Week, Jun. 22, 1998, pp. 166-168.

"Taming the Info Monster," Business Week, Jun. 22, 1998, pp. 170-172.
Krantz, Michael, "Click Till You Drop," Time, Jul. 20, 1998, pp. 34-39.
"Heroes of a Wild and Crazy Stock Ride," Time, Jul. 20, 1998, pp. 42-43.
"Future Shop," Forbes, Apr. 6, 1998, pp. 37-52.
"The Virtual Mall Gets Real," Business Week, Jan. 26, 1998, pp. 90-91.
"Are Tech Buyers Different?" Business Week, Jan. 26, 1998, pp. 64-68.
"A Little Privacy, Please," Business Week, Mar. 16, 1998, pp. 98-100.
"Web Ads Start to Click," Business Week, Oct. 6, 1997, pp. 128-138.
Meeker, Mary, "Tehnology: Internet/New Media: The Internet Advertising Report," Dec. 1996, pp. I-XIV and 1-1 to 2-16.
"Database Marketing: A Potent New Tool for Selling," America Online:DadiA, Tuesday, Sep. 5, 1994, pp. 1-8.
Fawcett, Adrienne Ward, "Trading Scissors for Modems," PBF Co., Inc., Jun. 7, 1995.
"Coupon Net Coupons and Rebates on the Internet," Press Release, Higgs America, 1995.
Shermach, Kelly, "Electronic Coupon Program Offers Data-Base Potential," 1995.
"Database marketing in an Online World," GartnerGroup, Oct. 17, 1996, 3 pp.
"Coaxing Meaning Out of Raw Data," Business Week, Feb. 3, 1997, pp. 134-135.
Elliott, Elaine X., "Clipping Coupons on the Web," Computer Shopper, Feb. 1997.
Magill, Ken, "Val-Pak, BigBook Ally to Deliver Coupons Online," Direct Marketing News, Jun. 16, 1997.
Magill, Ken, "BonusMail Rewards Prospects for Reading E-Mail," Direct Marketing News, Jul. 14, 1997.
Schwartz, John, "Trail of Crumbs Leads Right to the Cyber-Cookie Jar," Washington Post: Networkings.
"How to Conceal Your Cookie," Oct.:Nov. 1996, p. 158.
Noack, David R., "Planes, Trains, and Cruise Lines," Internet World, Jul. 1996, pp. 82-86.
"Survey Says most Business Travelers Will Book Travel Online in Two Years," Business Wire, Feb. 27, 1997, 3 pp.
Baig, Edward, "Surfing for Safaris—or Cruises, Beaches, B&Bs . . . ," Business Week, May 20, 1996, pp. 106-107.
Mills, Mike, "Weaving a Web of Computer Sales," Washington Post: Around the Beltway, Jan. 20, 1997, pp. 17-19.
Sager, Ira, et al., "The Race Is on to Simplify," Business Week, Jun. 24, 1996, pp. 72-75.
Hof, Robert D., "These May Really Be PCs for the Rest of Us," Business Week, Jun. 24, 1996, pp. 76-78.
Cortese, Amy, "Software's Holy Grail," Business Week, Jun. 24, 1996, pp. 83-92.
Gross, Neil, "Defending the Living Room," Business Week, Jun. 24, 1996, pp. 96-98.
Edmondson, Gail, et al., "Operator, Get Me Cyberspace," Business Week, Jun. 24, 1996, pp. 103-110.
Burrows, Peter, "The Day of the Designer," Business Week, Jun. 24, 1996, p. 114.
Verity, John W., "Making Computers Disappear," Business Week, Jun. 24, 1996, pp. 118-119.
Richards, Kathleen, "Software Sales Up 26 Percent," CRW, Aug. 19, 1996, pp. 2, 8.
Hutheesing, Nikhil, "Speaking with One Voice," Forbes, Sep. 23, 1996, pp. 214-215.
Henschen, Doug, "What's Driving GM's Online Ads?" Direct Marketing News, May 5, 1997, pp. 1, 58.
"It's a Womyn Thing," Webmaster, Oct. 1996, p. 16.
Evans, Judith, "An Inncentive to Return," Washington Post, Apr. 5, 1997.
"Amex Intros Point-of-Sale Rewards," Direct Marketing News, May 7, 1997.
"Technology and the Future of the Payments Industry," Speech to the Conference on Bank Structure, May 1, 1997—Federal Reserve Bank of Chicago, 21 pp.
Henschen, Doug, "Amex Intros Point-of-Sale Rewards Program," Direct Marketing News, May 12, 1997, pp. 1, 42.
Farhi, Paul, "The Airwaves Meet the Airways in New Frequent-Flier Promotion," Washington Post, Jun. 2, 1997.
Henschen, Doug, "SkyMall Will Bow High-Powered Web Mall," Direct Marketing News, Jun. 23, 1997.
Wijnen, Renee, "Ben Marketing Promotes Holiday Inn," Direct Marketing News, Jul. 28, 1997.
"Direct Mail Is King," The American Salesman, Jul. 1996, pp. 3-5.
"Coupon Clippers, Save Your Scissors," BusinessWeek, Jun. 20, 1994, 3 pp.
Beasley, Laurie, "Running Direct Mail Campaigns by the Numbers," , 8 pp.
Hannover; Dan, "Going Places: The Old Paper Workhorse Is Taveling a Different Trajectory and Is Ablaze with New Possibilities," Promo Magazine, Apr. 1997, pp. 20-34.
"Marketing Spending on the Rise," Sales & Marketing Management, Apr. 1997, p. 14.
Duclaux, Denise, "Importance of Direct Mail Coupons Underscored in Cox Direct Survey," Direct Marketing News, May 12, 1997.
Magill, Ken, "New Service Gives Credit to Consumers' Card Choices," Direct Marketing News, Jul. 28, 1997, pp. 1, 46.
Corcoran, Elizabeth, "On-Line Sites to Behold," Washington Post, pp. 19, 22.
"Holding the Keys to Internet Addresses," Washington Post, Washington Business, Jul. 22, 1996.
Goth, Nikki C., "Rule No. 1: Less Is More," HITS.1.
Corcoran, Elizabeth, "1 in 6 U.S. Adults Regularly Online, Study Indicates," Washington Post.
Rushkoff, Douglas, "Hanging Out at the Corner Candy Store," Virtual City, Spring 1996, p. 13.
"CitySearch Has Company," HITS.1, p. 24.
"Channeling Cable Television," Discovery Channel Online: HITS.1, p. 41.
"The Cyberstars List," Virtual City, Spring 1996, pp. 37-43.
Ross, Philip E. and Hutheesing, Nikhil, "Along Came the Spiders," Forbes, Oct. 23, 1995, pp. 210-216.
"How the Center of the Computing Universe Has Shifted," Business Week, Apr. 3, 1995.
Prosise, Jeff, "Researching with the Web," PC Magazine, Jun. 11, 1996, pp. 235-238.
"Internet Phones: The Future Is Calling," Internet World, Jun. 1998, pp. 40-51.
"Surf and Grow Rich!" Forbes ASAP, Jun. 3, 1996, pp. 36-38.
Schiller, Zachary, "For More About Tide, Click Here," Business Week,'Jun. 3, 1996, p. 44.
Corcoran, Elizabeth, "On the Internet, a Worldwide Information Explosion Beyond Words," Washington Post.
Chandrasekaran, Rajiv et al., "Countless Levels of Data Reachable on Local Pages of World Wide Web," Washington Post.
"Funds in Cyberspace," Barron's Lipper Mutal Funds Quarterly, Jul. 8, 1996, p. F7.
Brueckner, Robert, "Taking on TV," Internet World, Jul. 1996, pp. 59-60.
Swisher, Kara, "There's No Place Like a Home Page," Washington Post.
Pluenneke, Jack, "Old Newshound, New Web Tricks," Business Week, Aug. 5, 1996, p. 16.
Neelakantan, Shailaja, "Freemail," Forbes, Aug. 12, 1996, p. 140.
Dunkin, Amy, "How to Practice Safe Surfing," Business Week, Sep. 9, 1996, pp. 120-121.
"À la recherche de . . . ," Netsurf, Sep. 1996, pp. 15-18.
Perkins, Anthony B., Internet Mania R.I.P., The Red Herring, Sep. 1996, p. 13.
Grove, Andrew S., "Is the Internet Overhyped?" Forbes, Sep. 23, 1996, pp. 108-117.
Hilzenrath, David S., "Jockeying for Local Leadership in the Dicey On-Line World," The Washington Post.
"Interactive Technology Strategies," Forrester, Oct. 1996, pp. 1-15.
Taylor, William C., "Who's Writing the Book on Web Business?" Fast Company, Oct.:Nov. 1996.

"101 Email Tips," PC Advisor, Issue 13, Oct. 1996, pp. 114-119.
Corcoran, Elizabeth, "Venture Capital Firm Kleiner Perkins Has Long Nurtured Internet Enterprises," Washington Post.
"This Way to Cyberspace," Business Week, Nov. 25, 1996, p. 166.
Chandrasekaran, Rajiv, "A Top-Dollar Web Service Awaits Returns," Washington Post, Nov. 4, 1996, pp. 19, 23.
Reinhardt, Andy, "Intel Inside the Net?" Business Week, Nov. 18, 1996, pp. 166-174.
Raisch, Robert, "The Web Is Not TV," Business.Net, Advertising & Marketing, Feb. 4, 1997.
"Digital City Acquires WP Studio Sites," Netday News, Feb. 3, 1997.
"Open Market to Acquire Waypoint," Netday News, Feb. 5, 1997.
Hof, Robert D., "Netspeed at Netscape," Business Week, Feb. 10, 1997, pp. 78-86.
Boscardin, Andrew, "Never Change Your E-Mail Address Again," PC Magazine, Feb. 4, 1997, p. 40.
Taylor, Catharine P., "I Want My Web TV—Eventually," Inter@ctive Week, Mar. 10, 1997, 2 pp.
Taylor, Catharine P., "Seattle Paves Way for Microsoft's Sidewalk," Inter@ctive Week, Apr. 7, 1997, 2 pp.
Levin, Carol and Hickman, Angela, "Brighter Notebooks," PC Magazine Online, Apr. 18, 1997.
Hickman, Angela and Levin, Carol, "No More Traffic Jams," PC Magazine Online, May 6, 1997.
Hof, Robert D., "Internet Communities," Business Week, May 5, 1997, pp. 64-85.
Rebello, Kathy, "Silicon Continent," Business Week, May 6, 1996, pp. 131-136.
Dibbell, Julian, "Smart Magic," Time Digital, Jun. 24, 1996, pp. 21-25.
Himelstein, Linda, "Power Politics—In Silicon Valley?" Business Week, Aug. 26, 1996, p. 59.
PC Advisor, Issue 13, Oct. 1996, pp. 92-96.
Klimek, Mark and Sheehan, David, "Introducing the New Tech CEO," Forbes ASAP, Oct. 7, 1996, pp. 65-68.
Forbes ASAP, Oct. 7, 1996, pp. 82-92.
"Faces Behind the Figures," Forbes, Dec. 30, 1996, p. 136.
"Bill a View from Olympus Gates," Forbes ASAP, Dec. 2, 1996, p. 165-166.
Blachno, Eric, et al., "First Virtual Holdings Inc. New Purchase Recommendation Rating: Attractive," Bear Stearns, Jan. 13, 1997.
Magill, Ken, "CKS Group to Buy SiteSpecific, Edning Its Tie with Harte-Hanks," Direct Marketing News, May 26, 1997.
"A Site for Selling," Washington Business, Jun. 9, 1997.
"Where Marketing Dollars Go," Inc., Aug. 1996, p. 88.
Novack, Janet, "The Data Miners," Progressive Grocer, Mar. 1996, pp. 67-68.
Welz, Gary, "The Ad Game," Internet World, Jul. 1996, pp. 51-57.
Dean, David, "Grey Flannel and Caffeine Overtake the Web," The Bookshelf, Internet World, Jul. 1996, pp. 110, 112.
Young, Scott, "Taking Measure," Internet World, Jul. 1996, pp. 96-97.
Nelson, S., "The Internet: Changing the Role of Direct Marketing," Marketing Knowledge & Technology, Sep. 27, 1996, 3 pp.
Kawasaki, Guy, "Smark Marketing Via the Internet," Forbes, Sep. 23, 1996, p. 218.
Feigenbaum, Randi, "Garbage In—And in and in," Business Week, Sep. 9, 1996, p. 110.
Denton, Nicholas, "Advertisers Eyeball the Net."
"Selling to Women Online/the Rules—After a Million Years or So, Men Still. Don't Get It," NetGuide Magazine, 3 pp.
Linsmayer, Anne, "Attracting Advertisers," PC—Motor, Jun. 1996, pp. 68, 70.
Taylor, Catharine P., "Banner Year," Wired, Mar. 1997.
"Web-Based Advertising: New Revenue Models Emerging," Gartner Group, Inc., 1997.
"'Interstitial' Ads May Incite," Phillips Interactive Marketing News, 1997.
Devine, Gene, "Gauging Your Costs on the Web," Direct Marketing News, May 10, 1997.
Magill, Ken, "1-800-Flowers, Amazon.com AOL Deals Are Major Boost to Online Marketing," Direct Marketing news, Jul. 14, 1997.

"Measuring Audiences on the Web: Implications for Marketers and Advertisers," Emerging Technologies Research Group, Find/SVP.
Schlesinger, Richard, "Using Electronic Commerce to Expand Markets and Increase Profits," Hemisphere, Inc.
Pelletier, Virginie, "Letting the Buyer Be Aware," HITS.1, Interactive Week, pp. 62,64.
Lecluyse, Eric, et al., "Le Commerce Sur Internet," Découvrir, Les Boutiques Virtuelles.
Robello, Kathy, "Making Money on the Net," Business Week, Sep. 23, 1996, pp. 104-118.
"Will Your Business," Webmaster, Oct. 1996, pp. 47-53.
Tadjer, Rivka, "Firms Hope the Smart Money Is on Net-Linked Hybrid Cards," The Wall Street Journal Interactive Edition, Nov. 30, 1996, 5 pp.
"Death of a Salesman," Online Tactics, Nov. 1996, vol. 2, No. 11.
Kawasaki, Guy, "A Web Site Sells," Forbes, Nov. 18, 1996, p. 264.
Thwaits, Alan, "Even on the Web, It's the Bottom Line That Counts," Comdex Daily, Wednesday, Nov. 20, 1996, pp. 6, 16.
"The Desktop Delivery Economy: Revolutionizing the Web," YankeeWatch, vol. 2, No. 8, Dec. 1996.
"'Net Shopping for 1997—Experts Promise a Surge in Online Commerce Activity; Check Out Our Sampler of Available Technology," Communications Week, 1997, 4 pp.
Port, Otis, "There's an ATM in Your Home Computer," Business Week, Feb. 1997.
"NETdelivery and iCat Announce Strategic Partnership iCat Launches Electronic Commerce Suite 3.0 and Jointly Markets With NET delivery—One-to-One Marketing Now Better Than Ever," PR Newswire, Feb. 1997.
Mikkelsen, Randall, "E-mail Seen As Key to Internet Commerce," Mercury Mail.
Kichen, Steve, "Cruising the Internet," Forbes, Mar. 24, 1997, pp. 198-199.
"Your Personal Shopper," PC Magazine OnLine, Mar. 1997, 2 pp.
"Viaweb Study Shows Few Web Purchases Are Impulse Purchases," Busines Wire, Apr. 1997.
"Electronic Money, Chipper, for Now," The Economist, Apr. 26, 1997, pp. 72, 77.
Amato-McCoy, Beena, "Catalina Cuts Its Electronic Clearing Test for Coupons," SN, Apr. 14, 1997, pp. 15-17.
Lever, Robert, "Smart Cards," Europe, Apr. 1997, pp. 16-18.
"The On-Line Retail Commerce Report: Study Highlights," May 5, 1997, 2 pp.
Magill, Ken, "Comparison Shopping Service Aims to Deliver Trackable Leads," DM News, May 19, 1997, pp. 19-20.
"In Search of the Perfect Market," The Economist, May 10, 1997.
"Exclusive—Web/Online Avertising to Top $2.5 Billion by 2000," Electronic Commerce, Jun. 1997, 3 pp.
Verity, John W., "Invoice? What's an Invoice?" Business Week, Jun. 10, 1996, pp. 110-112.
"IBM, Gemplus Reach Pact on Promoting Smart Cards," Wall Street Journal, Jul. 18, 1997.
Hof, Robert D., "Don't Surf to us, We'll Surf to You," Business Week, Sep. 9, 1996, pp. 108-109.
Wildstrom, Stephen H., "Web Sites Come Looking for You," Business Week, Nov. 18, 1996, p. 26.
Kilshiemer, Joe, "There's a Boom in Push Software," The Orlando Sentinel, Dec. 14, 1996, 3 pp.
"Forget Browser Wars, Now It's Push-Pull Debate," Newswire article, Jan. 1997, 2 pp.
Bank, David, "Instead of Clicking Pages, Users View 'Channels' on the Desktop," The Wall Street Journal, Dec. 13, 1996.
Poletti, Therese, "Internet 'Push' Technology Coming on Strong," Reuters NewMedia, Jan. 1, 1997, 2 pp.
Outing, Steve, "Push Technology and Marketing," Interactive, Jan. 13-14, 1997, 3 pp.
"Online Q&A," PC Advisor, Issue 13, Oct. 1996, p. 84-85.
Marable, Leslie, "Push Product Gives Managers Some Control," Web Week, vol. 3, Issue 2, Jan. 20, 1997, 2 pp.
Andrews, Whit, "With Push, It's All About Being Front and Center," Web Week, vol. 3, Issue 2, Jan. 20, 1997, 3 pp.

Andrews, Whit, "Verity Acquires Cognisoft, a Push Specialist $10 Million Deal Opens Intranet Market to Search Veteran," Web Week, vol. 3, Issue 2, Jan. 20, 1997, 3 pp.

Rothstein, Edward, "Making the Internet Come to You, Through 'Push' Technology."

Berst, Jesse, "Why the Web Is Pushing Us Around," ZD Net AnchorDesk.

Berst, Jesse, "'Push' Products Redefine Internet," ZD Net AnchorDesk.

Berst, Jesse, "Super Channel Changer Still Remote," ZD Net AnchorDesk.

"Mainstream Media Confront Push," Interactive Content, Jan. 1997, pp. 1-11.

Fleming, Lee, "New Players, But Still the Same Old Questions; Digital Distribution: Pushing Content to the Desktop," DIG Research, Jan. 31, 1997, 10 pp.

Harmon, Steve, "Tune Into Tomorrow: Push Could Be a Multibillion Industry," Internet Daily Stock Report, Feb. 28, 1997.

Cortese, Amy, "It's Called Webcasting, and It Promises to Deliver the Info You Want, Straight to Your PC," Business Week, Feb. 24, 1997, pp. 95-104.

"'Push' Buttons Worth Pressing," Business Week, Feb. 24, 1997, pp. 106-107.

Hoffman, Donna L., et al., "Pushing Passive Eyeballs," Wired, Mar. 1997.

Chandrasekaran, Rajiv, "The Big Push?" Washington Post, May 11, 1997.

Magill, Ken, "PointCast Push Technology to Deliver College Market," Direct Marketing News, Jun. 2, 1997, pp. 19-20.

Levey, Richard H., "Spam No More: Mailers Turn E-Mail Lists Into Foie Gras," Direct Magazine, Jun. 1997, 4 pp.

Asato, Cathy, "Unsolicited E-Mail Gets Sacked," Direct Marketing News, Jun. 23, 1997.

Sandberg, Jared, et al., "Two Start-Up Firms Unveil Software to 'Push' Information on the Internet," Wall Street Journal, Oct. 7, 1996.

Rudich, Joe, "News in Your Mailbox," Online User, Nov./Dec. 1996.

Comaford, Christine, "Don't Call the Web; Let It Call You," PC Week, Nov. 4, 1996, 3 pp.

"McAfee, BackWeb Will Develop Service to Send Updates Via Net," Wall Street Journal Interactive Edication, Jan. 17, 1997, 2 pp.

Grady, Barbara, "Silicon Valley Firm Puts 'Push' to Corporate Use," The PointCast Network, Mar. 5, 1997, 2 pp.

Rigdon, Joan Indiana, "Marimba's Hot Castanet Spotlights CEO," Wall Street Journal, Dec. 3, 1996.

Andrews, Whit, "A Coup for Marimba As Lotus Signs on," Web Week, vol. 3, Issue 2, Feb. 3, 1997, 2 pp.

Moukheiber, Zina, "Hot Company, Cool Code," Forbes, Nov. 18, 1996, pp. 60-61.

Corcoran, Elizabeth, "Hoping 'Castanets' Will Click," Washington Post, Nov. 1996.

Wahl, Amy, "Internet's Influence Is Everywhere . . . Over Everything," Comdex Daily, Nov. 21-22, 1996.

Hutheesing, Nikhil, "Spider's Helper," Forbes, Jul. 1, 1996, p. 79.

Chandrasekaran, Rajiv, "Spanning the Globe with Unibex," Washington Post, Sep. 16, 1996.

Judge, Paul C., "Why Firefly Has Mad Ave. Buzzing," Business Week, Oct. 7, 1996, pp. 100-101.

Ziegler, Bart, "Would People Like Advertising Better if They Were Paid to Look at It?" Wall Street Journal, Nov. 14, 1996.

Moukheiber, Zina, "DoubleClick Is Watching You," Forbes, Nov. 4, 1996, pp. 342, 344.

"Firefly Extends Platform, Acquires NetAngels," Firefly Network, Inc., Feb. 3, 1997.

Verity, John W., "Just Say No to E-Junk."

"EvansGroup Launches Futureworks New Media/Smart, Integrated Approach to Digital Media Marketing," Business Wire, Electronic Commerce.

Magill, Ken, "DoubleClick Introduces Cost-Per-Action Ad Payment," Direct Marketing News, Jul. 14, 1997.

Shannon, Victoria, "Inquiring Minds Want to Know the Secrets of your On-Line Line," Washington Post.

Wildstrom, Stephen H., "They're Wastching You OnLine," Business Week, Nov. 11, 1996, p. 19.

"Online Viewers Are Not Comfortable With Web Sites That Require Registration," New Media Week, Jan. 14, 1997.

"Direct Marketing Association Finalizes Self-Regulation Principles for Online Marketing," Business Wire, Jan. 28, 1997.

"Survey Reveals Consumer Fear of Privacy Infringement Inhibits Growth of Electronic Commerce," Trust, Boston Consulting Group.

Eckhouse, John, "Leaving Tracks on the Net," Homepec, Apr. 1997, pp. 91-96.

Lawsky, David, "Once-Private Information Now Available on the Web," Jun. 10, 1997.

Magill, Ken, et al., "Net Privacy Fixes Bow at FTC Workshop," Direct Marketing News, Jun. 23, 1997.

Chandrasekaran, Rajiv, "It All Ads Up to Who You Know," Washnington Business, Jun. 9, 1997, pp. 15, 17.

Bruner, Rick E., "Web Services Market to One," Advertising Age, Aug. 4, 1997.

AT&T GIS and MEI Offer In-Store Electronic Coupon Solution, News Release, AT&T Global Information Solutions, May 2, 1994.

Porter, Arthur L., "Strengthening Coupon Offers by Requiring More From the Customer," The Journal of Consumer Marketing, vol. 10, No. 2, 1993, pp. 13-18.

"Proper Use of Consumer Information on the Internet," White Paper, Jun. 1997, PowerAgent, Inc., 14 pp.

"A Look at America Online," Washington Post, Sep. 16, 1996.

"Correction—Excite, Inc.," Mercury Mail, 3 pp., Mar. 19, 1997.

"Online Shopping Survey Shows Lots of Looking, Little Buying," Online Shoping Stats, Jun. 15, 1997, 2 pp.

"In Search of the Perfect Market," The Economist, May 10, 1997, 2 pp.

"Doubling Games," The Economist, www.economist.com/surveys/elcom/ec2.html, 1997, 3 pp.

"A River Runs Through It," The Economist, www.economist.com/surveys/elcom/ec3.html, 1997, 2 pp.

"Tremble, Everyone," The Economist, www.economist.com/surveys/elcom/ec4.html, 1997, 4 pp.

"Cash Poor," The Economist, www.economist.com/surveys/elcom/ec5.html, 1197, 3 pp.

"Timorous Trade," The Economist, www.economist.com/surveys/elcom/eco.html, 1997, 2 pp.

"Big, Boring, Booming," The Economist, www.economist.com/surveys/elcom/ec7.html, 1997, 2 pp.

"From here to Eternity," The Economist, www.economist.com/surveys/elcom/ec8.html, 1997, 2 pp.

"In Search of the Perfect Market," The Economist, ww.economist.com/surveys/elcom/ec1.html, 1997, 3 pp.

"American Express Offers Cardmembers Access to Account information on World Wide Web Cardmembers Gain Convenient Way to View and Manage Card Account Information Online," American Express, 1997.

"Interactive," Advertising Age, Nov. 10, 1997.

Ecke, Raymond, "Cyberbargains: Media Circus' Online Coupon Clip Service,"

* cited by examiner

*(rotated figure showing display 325/340 with article 315/335 and e-centives table)*

Article text (335):
Atlanta- Georgia Tech can move toward it's first Atlantic Coast Conference crown in eight years and further damage Florida State's league title hopes when they collide Saturday evening. The no. 19 Yellow Jackets (5-1, 4-0, ACC) are the conference's lone unbeaten team after rallying from a 21 point deficit last Saturday to defeat previously undefeated Virginia, 41-3-8. An FSU loss would all but eliminate the Seminoles (5-1, 3-1) who won or shared the league championship in all five sessions in the ACC
Game Report
College Front Page e-centives 1- 10 of 63

| Store | | | How to Redeem |
|---|---|---|---|
| ArtSelect ABC | Free Shipping | Plus 10% Off Your Next Order Exp: 11/15/1998 ☐ | Buy It |
| Store B | 10% OFF | Jerbeau Chocolates 15 Piece Assortment Exp: 11/15/1998 ☐ | Buy It |
| ABC MESE | 30% OFF | Spa-in-a-Box Aromatherapy Skincare Line Exp: 11/15/1998 ☐ | Buy It |
| Flowers USA | 10% OFF | Storewide Discount for e-centives Members Exp: 12/15/1998 ☐ | Buy It |
| Road Trip | 50% OFF | VacationPass Card - Only $29.85! Exp: 12/15/1998 ☐ | Buy It |
| National Geographic | Save $15 | National Geographic World Atlas (retail $80 - online $65) Exp: 11/15/1998 ☐ | Buy It |
| Hickory Farms | 25% OFF | Cherry Bud Candies Exp: 10/31/1998 ☐ | Buy It |

INCENTIVE NETWORK FOR DISTRIBUTING INCENTIVES ON A NETWORK-WIDE BASIS AND FOR PERMITTING USER ACCESS TO INDIVIDUAL INCENTIVES FROM A PLURALITY OF NETWORK SERVERS

RELATED APPLICATIONS

This application is a continuation of application No. 11/056,167, filed Feb. 14, 2005 now abandoned, which is a continuation of application No. 09/251,480, filed Feb. 17, 1999, now U.S. Pat. No. 7,958,224, issued Jun. 7, 2011. The previously identified patents and/or patent applications are hereby incorporated by reference, in their entireties.

BACKGROUND OF THE INVENTION

1. Field of the Invention

This invention relates to electronic commerce and, more particularly, to an incentive network that provides systems, apparatus, and methods for distributing incentives on a network-wide basis and for permitting user access to incentives from any network server, thereby improving the incentive distribution and redemption processes.

2. Description of the Related Art

The Internet has been hailed the marketplace of the future, a result of its accessibility and usability. A computer equipped with a communication mechanism such as a modem and telephone connection is nearly all that is necessary to gain access to the Internet. A program called a browser, recently incorporated as part of at least one computer operating system, i.e., Windows 95 from Microsoft Corp., makes it a simple task to traverse the vast network of information available on the Internet and, specifically, its subpart known as the "World Wide Web," or more simply, "the Web."

The architecture of the Web follows a conventional client-server model. The terms "client" and "server" are used to refer to a computer's general role as a requester of data (the client) or provider of data (the server). Under the Web environment, Web browsers reside in clients and specially formatted "Web documents" reside on Internet (Web) servers. Web clients and Web servers communicate using a protocol called "HyperText Transfer Protocol" (HTTP).

In operation, a browser opens a connection to a server and initiates a request for a document. The server delivers the requested document, typically in the form coded in a standard "HyperText Markup Language" (HTML) format. After the document is delivered, the connection is closed. The browser displays the document or performs a function designated by the document.

Every day, more people gain access to the Web, and every day, more of them are shopping online. Online shopping provides a level of convenience they want, need and will soon demand. Electronic commerce or "e-commerce" is the term often used to refer, at least in part, to online shopping on the Web. E-commerce is a unique opportunity for businesses of any size. E-commerce can expand a company's marketplace-and consequently, its customer database. By simply providing a Web server having information on the company's product offerings and the customer database, and linking the Web server to the Web, the company can track visits, sales, buying trends and product preferences-all at the customer level. The company can then present its customers with products they are most likely to buy—on an individual basis. For this reason alone most marketing professionals consider the Web to be one of the best direct marketing tools.

But the number of retailers with online stores is growing exponentially every year, making it increasingly difficult for online shoppers to navigate the Web to locate particular products at the best prices. At one site, called the "Internet Mall," online shoppers can browse through more than 20,000 "virtual stores." This challenge for consumers also introduces a problem for merchants in designing campaigns to attract consumers to the merchants' Web sites and away from their competitors' sites.

In the past, even before the Web, companies explored a number of options for attracting consumers to purchase their products. One method often used for this purpose is an incentive program. Companies would offer incentives, including awards, discounts, coupons, points, and similar devices, to induce consumers to purchase particular products. Applying this marketing device to the Web is a significant challenge because of the enormous size of the Web and its online shopping Web sites.

Some incentive companies provide their own Web sites where consumers can access, view, and use their incentives. But distribution for purposes of achieving consistent usage is the significant challenge for companies offering online access to incentives. For any incentive campaign to be effective it needs to reach the largest number of potential consumers, regularly remind them of the availability of the incentives, and not be overly intrusive. Furthermore, targeting the incentives based on individual consumer preferences will yield even better results. For example, if an incentive campaign designed to lure consumers to purchase a particular computer is going to be successful, the campaign should reach the maximum possible number of consumers interested in purchasing computer products. In all known online implementations for distributing incentives, however, consumers must access either a merchant's Web site or the Web site of an incentive company to retrieve the incentives.

Accordingly, there is a need for a system that provides network-wide access to incentives, thus increasing the effectiveness of online marketing campaigns.

SUMMARY OF THE INVENTION

Methods, systems, and articles of manufacture consistent with the present invention overcome the shortcomings of existing systems for electronically distributing incentives by providing an incentive network equipped with methods for distributing incentives on a network-wide basis and for permitting user access to individual incentives from any network server. An incentive network like this improves the incentive distribution and redemption processes.

In accordance with one aspect of the invention, as embodied and broadly described herein, a method performed by a server for accessing incentives in an network, comprises steps of receiving an access request from a device associated with a user and connected to the network, transmitting identifying information corresponding to the access request to a host, receiving incentive information from the host reflecting available incentives corresponding to the identifying information, and transmitting a network document, including the incentive information, to the device associated with the user in response to the access request. The step of receiving an access request from a device associated with a user may include receiving a request for a document containing data stored at least in part on the server. The step of transmitting identifying information corresponding to the access request to a host may include determining whether an indication exists that the user subscribes to receive information associated with available incentives. The step of determining whether an indication exists that the user subscribes to receive information associated with available incentives may include transmitting a subscriber request to the device associated the user, and receiving a response from the device associated with the user, including a subscriber ID. The step of transmitting identifying information corresponding to the access request to a host may include transmitting a subscriber ID corresponding to the device associated with the user to the host and an server ID corresponding to the server. The step of receiving incentive information from the host reflecting available incentives corresponding to the identifying information may include receiving incentive information reflecting a selection of incentives based on at least one of the subscriber ID and the server ID. The step of receiving incentive information from the host reflecting available incentives corresponding to the identifying information may include transmitting a subscriber ID corresponding to the device associated with the user to the host.

In accordance with another aspect of the present invention, as embodied and broadly described herein, a computer-implemented method for accessing incentives in an network, comprises transmitting an access request to access a server in the network, receiving a subscriber request for a subscriber ID associated with the access request, transmitting the subscriber ID to the server, and receiving in response to the access request incentive information reflecting available incentives corresponding to the subscriber ID, wherein the server provides the subscriber ID to a host that selects and transmits the incentive information to the server. The step of transmitting an access request to access a server in the network may includes providing a browser enabling a user to formulate and transmit the access request. The step of receiving in response to the access request incentive information reflecting available incentives corresponding to the subscriber ID, wherein the server provides the subscriber ID to a host that selects and transmits the incentive information to the server, may include receiving selected incentive information reflecting a server ID associated with the server, wherein the server provides the server ID to the host for selection of the incentive information.

In accordance with yet another aspect of the invention, a system is provided for serving individual account information from a central host computer to a plurality of intermediate host computers that will transmit the information to a plurality of client computers.

BRIEF DESCRIPTION OF THE DRAWINGS

The accompanying drawings, which are incorporated in and constitute a part of this specification, illustrate an implementation of the invention and, together with the description, serve to explain the advantages and principles of the invention. In the drawings.

DETAILED DESCRIPTION

Reference will now be made in detail to an implementation consistent with the present invention as illustrated in the accompanying drawings. Wherever possible, the same reference numbers will be used throughout the drawings and the following description to refer to the same or like parts.

Introduction

Systems consistent with the present invention implement an incentive network for distributing incentives on a network-wide basis and for permitting user access to individual incentives from any network server. The incentive network designed in accordance with the principles of the present invention improves the incentive distribution and redemption processes. The incentive network includes at least one incentive host server and a plurality of incentive network servers. By providing in each incentive network server an access mechanism to the incentive host server, client systems requesting documents from an incentive network server are presented with information on selected incentives. When a user operating a client system requests a document from a server participating in the incentive network, the access mechanism determines whether the client system is identified by a unique subscriber identification (ID) corresponding to a subscriber to the incentive network.

If no ID is present in the client system, the access mechanism presents in the requested document a tool through which the user may subscribe to the incentive network. If the ID exists on the client system then the incentive network server uses the ID to access the incentive host server and retrieve and display information on incentives currently available to the subscriber. This makes the information on available incentives accessible to the subscriber throughout the incentive network. It also permits a subscriber to redeem a selected incentive from anywhere in the network by simply including in the document requested from the incentive network server both information on the available incentives and information on how to redeem them. For example, the document may include a link to another server, which may or may not be a part of the incentive network, at which the incentive may be applied to an online purchase.

Network Architecture

Figure 1:
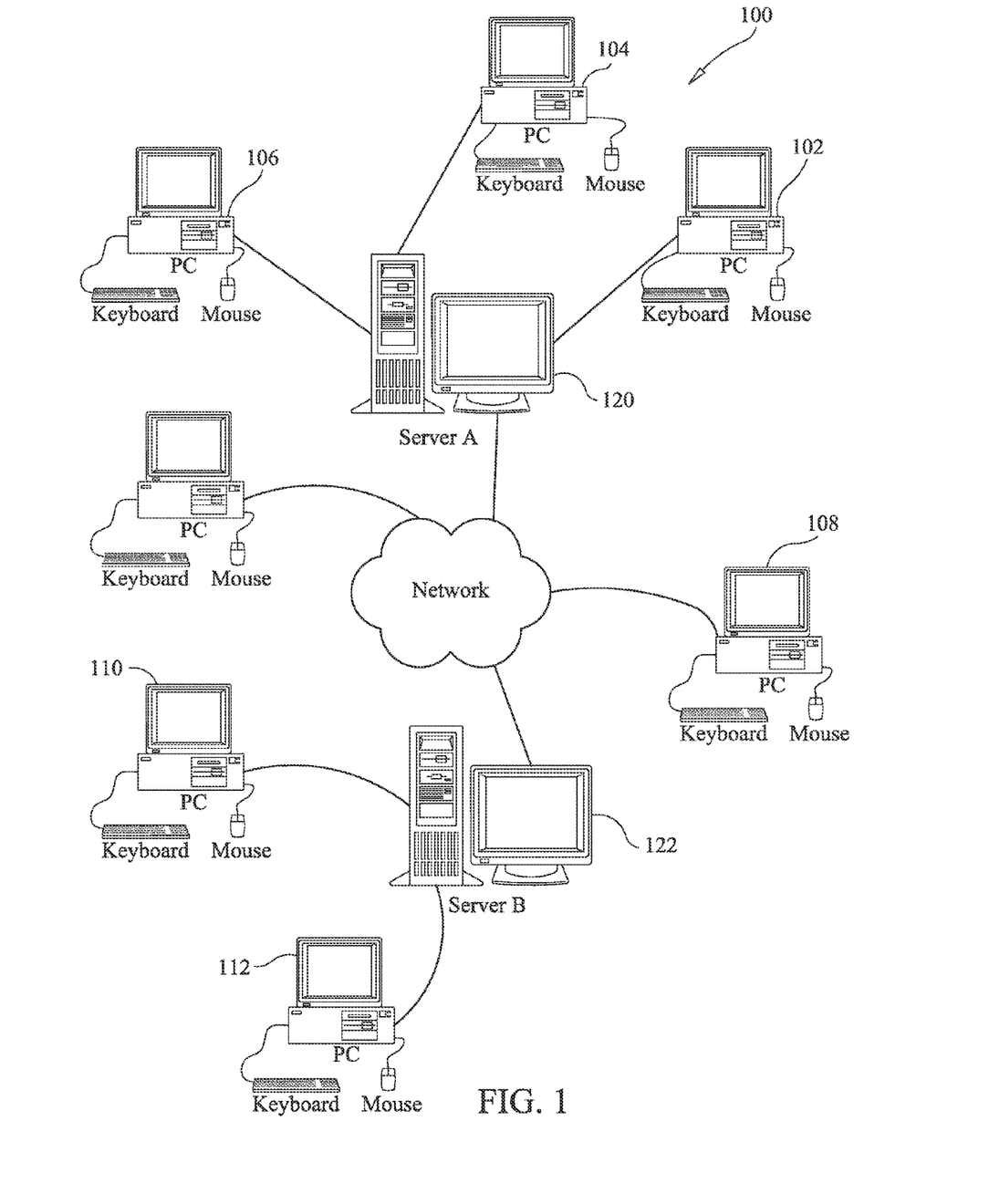
FIG. 1 is a pictorial diagram of a computer network in which systems consistent with the present invention may be implemented.

FIG. 1 illustrates a conceptual diagram of a computer network 100, such as the Internet. Computer network 100 comprises small computers (such as computers 102, 104, 106, 108, 110 and 112) and large computers (such as servers 120 and 122). In general, small computers are "personal computers" or workstations and are the sites at which a human user operates the computer to make requests for data from other computers or servers on the network. Usually, the requested data resides in large computers. In this scenario, small computers are clients and the large computers are servers.

In this specification, the terms "client" and "server" are used to refer to a computer's general role as a requester of data (client) or provider of data (server). In general, the size of a computer or the resources associated with it do not preclude the computer's ability to act as a client or a server. Further, each computer may request data in one transaction and provide data in another transaction, thus changing the computer's role from client to server, or vice versa.

A client, such as computer 102, may request a file from server A 120. Since computer 102 is directly connected to server A 120, for example, through a local area network, this request would not normally result in a transfer of data over what is shown as "network" of FIG. 1. The "network" of FIG. 1 represents, for example, the Internet, which is an interconnection of networks. A different request from computer 102 may be for a file that resides in server B 122. In this case, the data is transferred from server B 122 through the network to server A 120 and, finally, to computer 102. The distance between server A 120 and server B 122 may be very long, e.g. across continents, or very short, e.g., within the same city. Further, in traversing the network the data may be transferred through several intermediate servers and many routing devices, such as bridges and routers.

Figure 2:
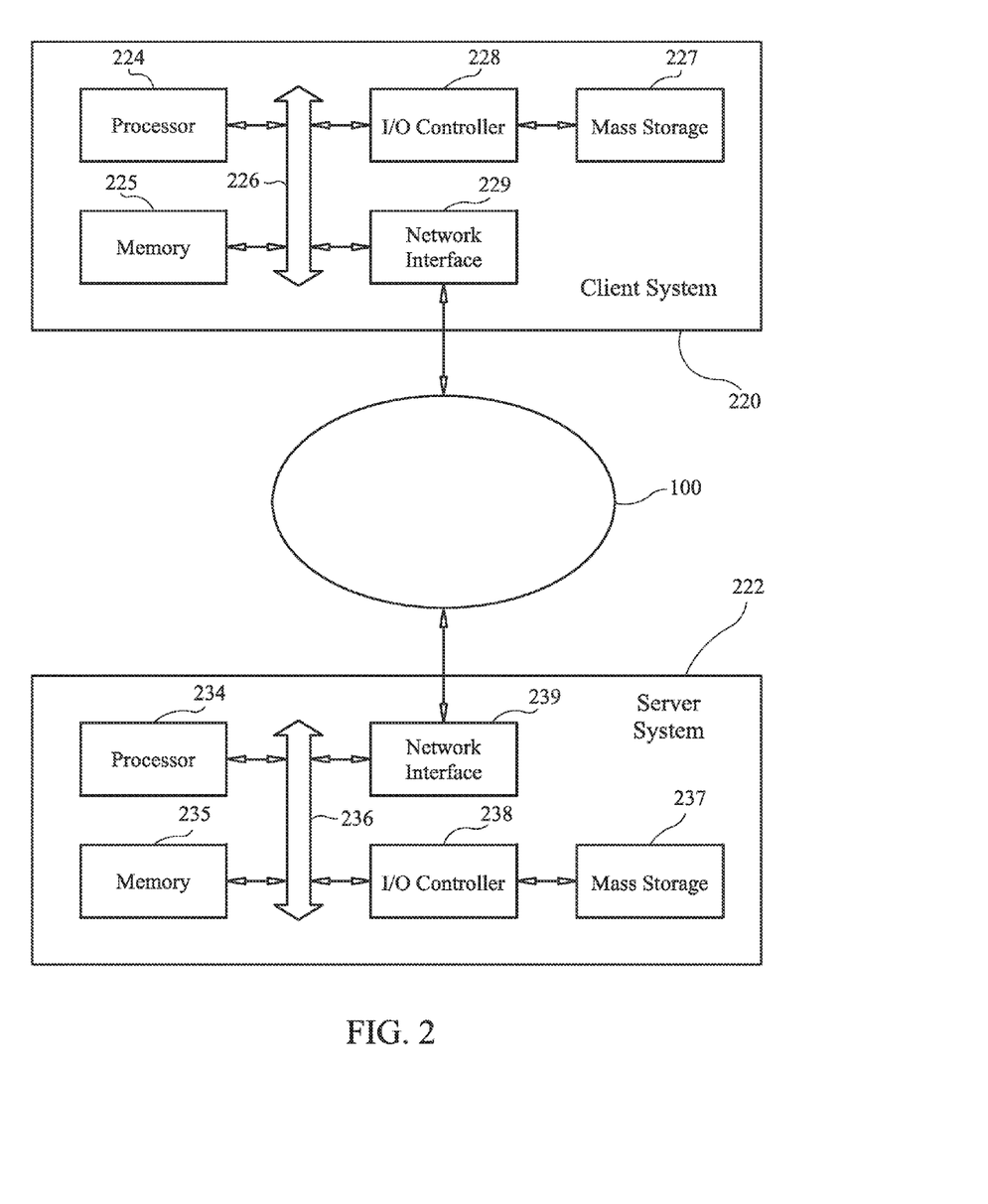
FIG. 2 shows a computer network containing a client system and a server system.

FIG. 2 shows, in more detail, an example of a client-server system interconnected through network 100. In this example, a remote server system 222 is interconnected through network 100 to client system 220. Client system 220 includes conventional components such as a processor 224, memory 225 (e.g. RAM), a bus 226 which couples processor 224 and memory 225, a mass storage device 227 (e.g. a magnetic hard disk or an optical storage disk) coupled to processor 224 and memory 225 through an I/O controller 228 and a network interface 229, such as a conventional modem.

Server system 222 also includes conventional components such as a processor 234, memory 235 (e.g. RAM), a bus 236 which couples processor 234 and memory 235, a mass storage device 237 (e.g. a magnetic or optical disk) coupled to processor 234 and memory 235 through an I/O controller 238 and a network interface 239, such as a conventional modem. It will be appreciated from the description below that the present invention may be implemented in software which is stored as executable instructions on a computer readable medium on the client and server systems, such as mass storage devices 227 and 237 respectively, or in memories 225 and 235 respectively.

Distributed Document Retrieval

The Internet consists of a worldwide computer network that communicates using a well-defined protocol known as the Internet Protocol (IP). Computer systems that are directly connected to the Internet each have a unique address consisting of four numbers separated by periods such as "192.101.0.3". To simplify Internet addressing, a "Domain Name System" was created that allows users to access Internet resources with a simpler alphanumeric naming system. For example, the name "usatoday.com" is the name for a computer operated by the USA TODAY newspaper.

To further define the location of resources on the Internet, a Uniform Resource Locator system was created that uses a Uniform Resource Locator (URL) as a type of "address" that specifically defines a type of Internet resource, such as a Web document and its location. URLs have the following format: "resource-type://domain.address/path-name." The "resource-type" defines the type of Internet resource. Web documents, for example, are identified by the resource type "http", which indicates the protocol used to access the document.

To access a document on the Web, the user enters a URL for the Web document into a browser program executing on a client system having a connection to the Internet. The Web browser then sends the document's URL in a request in accordance with the HTTP protocol to the Web server that has the Web document. The Web server responds to the request by transmitting the requested object to the client. In most cases, the object is a plain text document containing text (in ASCII) that is written in HTML. Such objects often contain "hyperlinks," URLs to other Web documents. The Web browser displays the HTML document on the screen for the user including the hyperlinks to other Web documents in a different color, or otherwise emphasized, such that the user can select the hyperlink.

Figure 3:
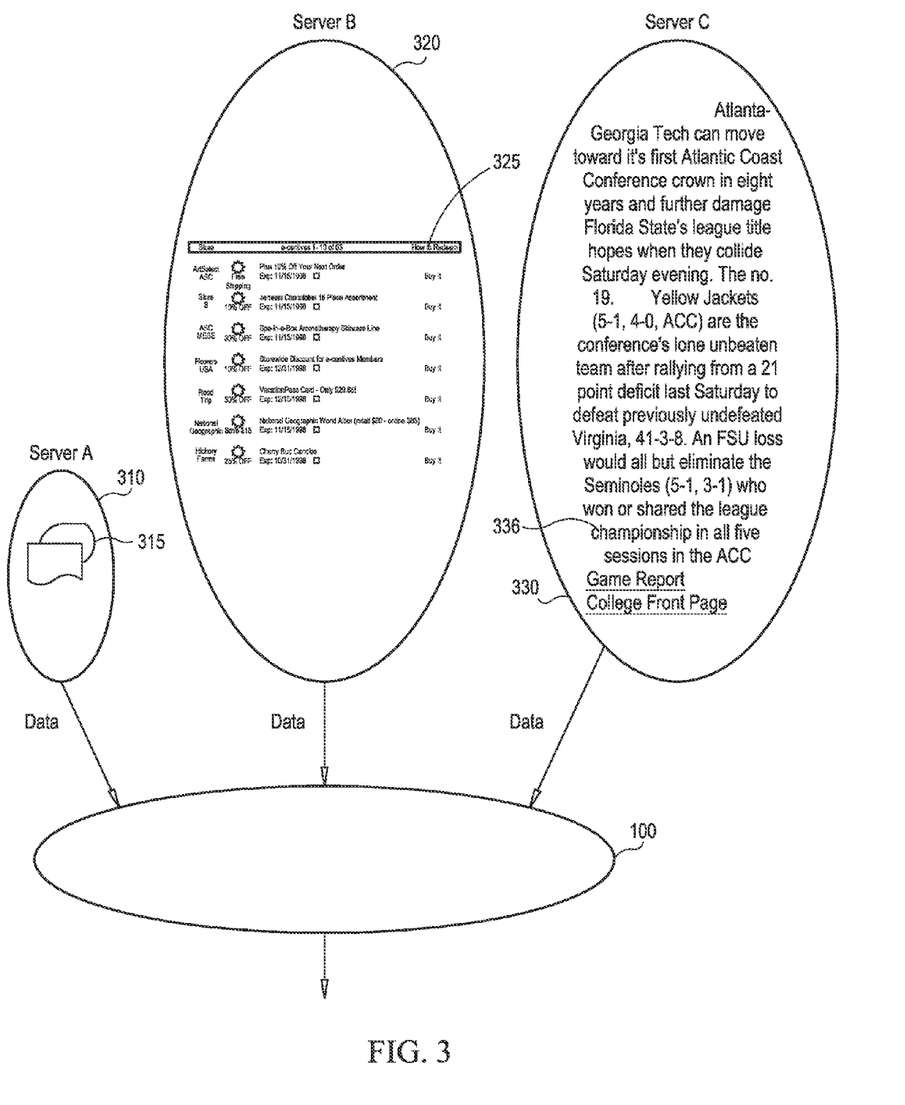
FIG. 3 illustrates the retrieval of remote text and images and their integration in a document.
Figure 3A:
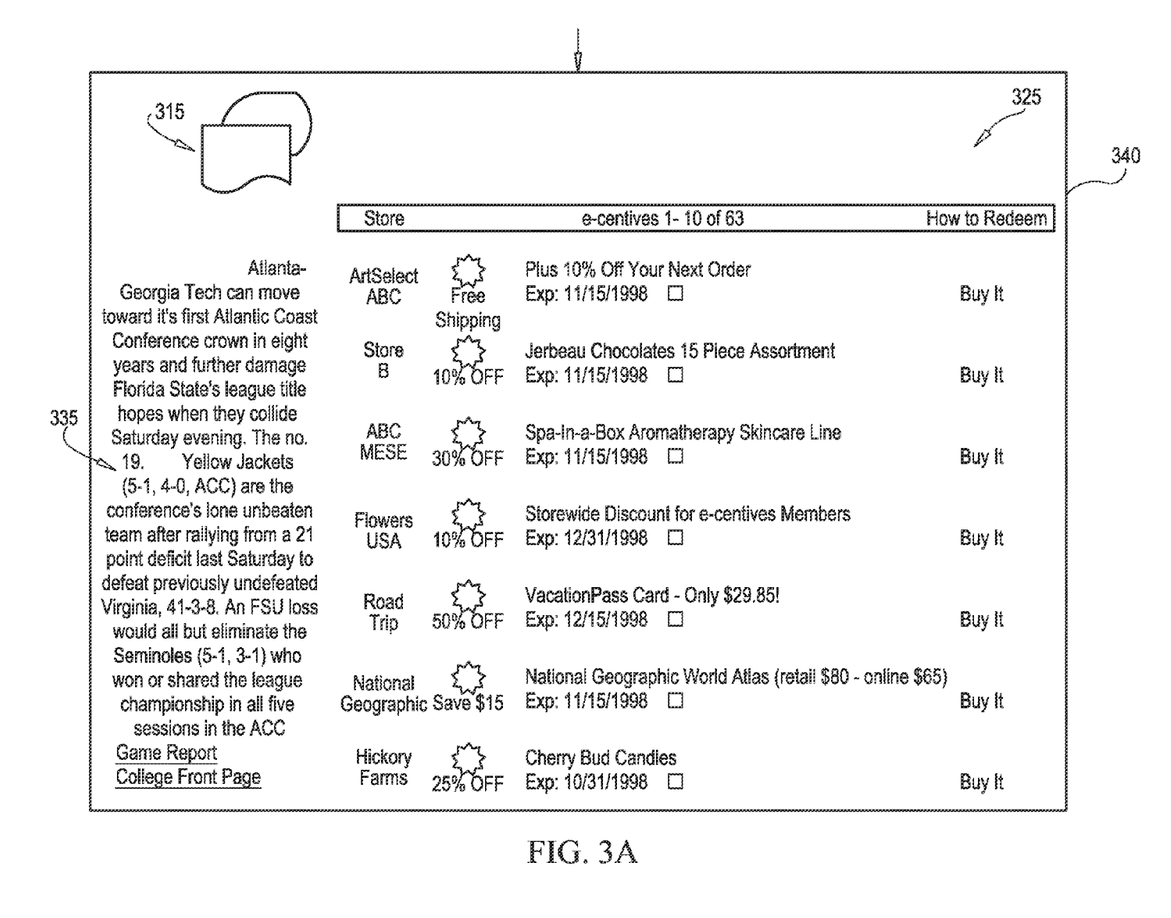

In some instances, the HTML document may contain data from more than one server. For example, FIG. 3 illustrates the retrieval of remote text and images and their integration in a Web document by a client system 340. In FIG. 3, server A 310 contains an image 315, server B 320 contains a combination of text and image data 325 and server C 330 contains text data 335. Each of these servers is remotely located from the other servers and client 340. The transfer of data is via network 100. It should be appreciated that the text and image files could be located in the same server which is remote from client 340.

Different techniques are available to display these types of composite Web documents. For example, a program called a servlet executing on one of the servers may combine data from the various servers referenced in a selected Web document and transmit the composite Web document to the client. In other configurations, the client may utilize a program called an applet, which may be transmitted to the client from one of the servers, to access the multiple servers offering parts of the composite and to build the composite Web document.

Network-Wide Access to Incentives

Figure 4:
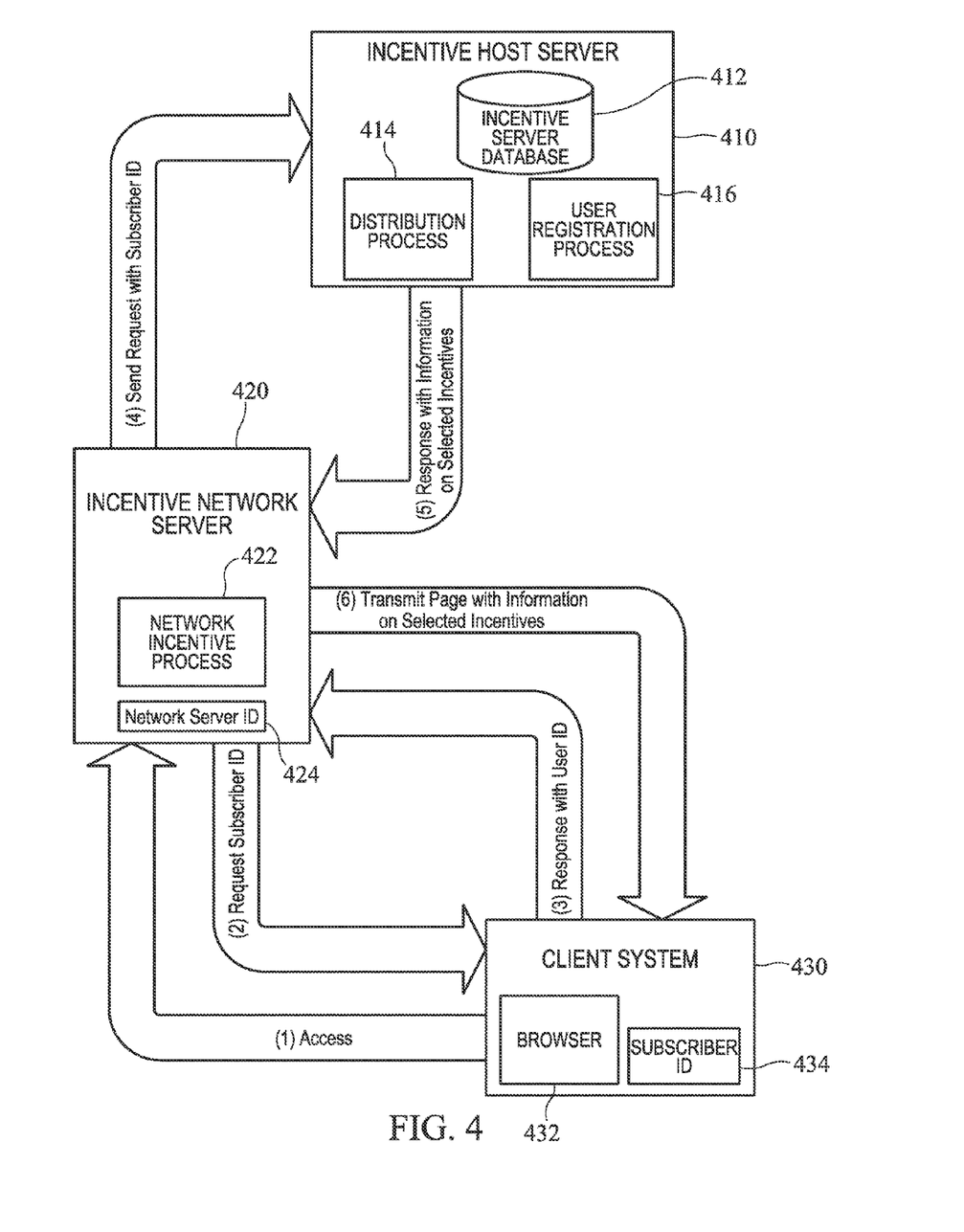
FIG. 4 is an operational flow diagram illustrating an incentive distribution process in a manner consistent with the principles of the present invention.

FIG. 4 is an operational flow diagram illustrating an incentive distribution process in a manner consistent with the principles of the present invention. In accordance with the principles of the present invention, an incentive network is comprised of at least one incentive host server and a plurality of incentive network servers. Each one of the incentive network servers may be an existing server on the Web or a new server to the Web configured to be a part of the incentive network.

As shown, incentive host server 410 includes an incentive server database 412, a distribution process subsystem 414, and a subscriber registration subsystem 416. Preferably, distribution process subsystem 414 comprises instructions defining a task running on a processor of host server 410. Incentive network server 420 includes a network incentive process subsystem 422 and storage 424 for storing a Network Server ID. Client system 430 includes browser program 430 and storage 434 for a subscriber ID.

When a user operating client system 430, which is executing browser program 432 such as "Navigator" from Netscape Corp., accesses incentive network server 420 to retrieve a Web document, network incentive process subsystem 422, sends a request to client system 430 for a stored subscriber ID. Assuming such an ID exists in storage 434, client system 430 transmits the ID to server 420. This request-response mechanism may be implemented in various ways, including as an applet program that server 420 transmits to system 430 upon initial access to server 420. In this implementation, the applet program searches system 430 for the ID, which may be stored in a "cookie," and sends a response, including the ID if present, to server 420.

When server 420 receives a subscriber ID, server 420 transmits the subscriber ID, and optionally the Network Server ID for server 420 held in storage 424, to incentive host server 410. Server 410 in turn uses subsystem 414 to access database 412 and locate a subscriber account, which includes information on incentives available to the subscriber based on the subscriber ID. In the situation in which the Network Server ID is transmitted, process 414 may use the Network Server ID to look in Incentive Server Database 412 for a list of specific incentives to be excluded or included based on the Network Server ID, and filter the incentives in the subscriber's account in accordance with the list before transmitting them to Network Server 420. In this fashion, Incentive Server 410 manages an exclusion list for each Incentive Network Server 420 and transmits specific incentives based on the list.

In a separate operation, discussed below with reference to FIG. 7, users subscribe to the incentive network by opening accounts with the incentive host server. At the successful completion of an account creation process, a subscriber ID is downloaded to the client system and stored there by the client system 430.

After server 410 locates information on incentives available to the subscriber, subsystem 414 responds to the request from server 420 with information on the available incentives for the subscriber. Subsystem 422 can then transmit the incentive information to client system 430 for display by browser 432.

Network Incentive Process Subsystem

Figure 5:
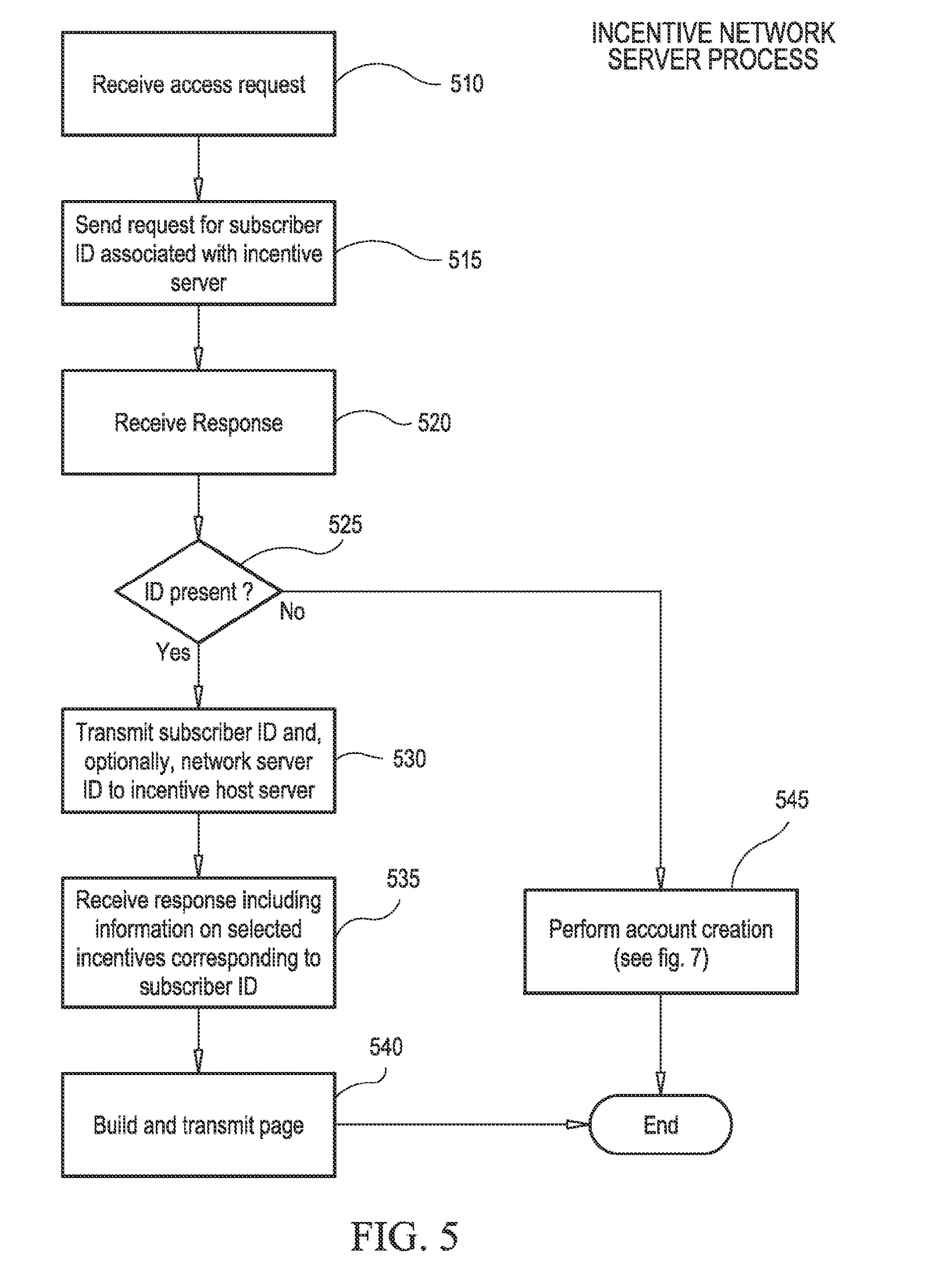
FIG. 5 is a flow chart of the steps performed by a server participating in the incentive network to distribute incentives in a manner consistent with the principles of the present invention.

FIG. 5 is a flow chart of the steps performed by a server participating in the incentive network, such as server 420 of FIG. 4, to distribute incentives in a manner consistent with the principles of the present invention. After a client system requests access to an incentive network server of the incentive network to retrieve a document (step 510), the network incentive process subsystem transmits a request for a subscriber ID stored in the client system (step 515). The subsystem then receives a response (step 520), and if an ID is present in the response (step 525), the subsystem transmits a request to the incentive host server with the ID from the client computer and optionally a Network Server ID associated with the subsystem's server (step 530). The intermediate server then receives a response from the incentive host server, including information on selected incentives currently available to the subscriber (step 535). Once it obtains the information on selected incentives, the incentive network server builds a document and transmits the document including information initially requested by the client system of the incentive network server along with the incentive information (retrieved from the incentive host server) to the client system (step 540). In this fashion, subscribers to the incentive network can access their incentives from any server in the incentive network.

If no subscriber ID exists (step 525), then the intermediate server transfers control to the incentive host server and the process continues with the account creation module (step 545), which is described below with reference to FIG. 7.

Incentive Host Server

As shown in FIG. 4, the incentive host server has two components: an incentive distribution process subsystem, and a subscriber registration subsystem.

Incentive Distribution

Figure 6:
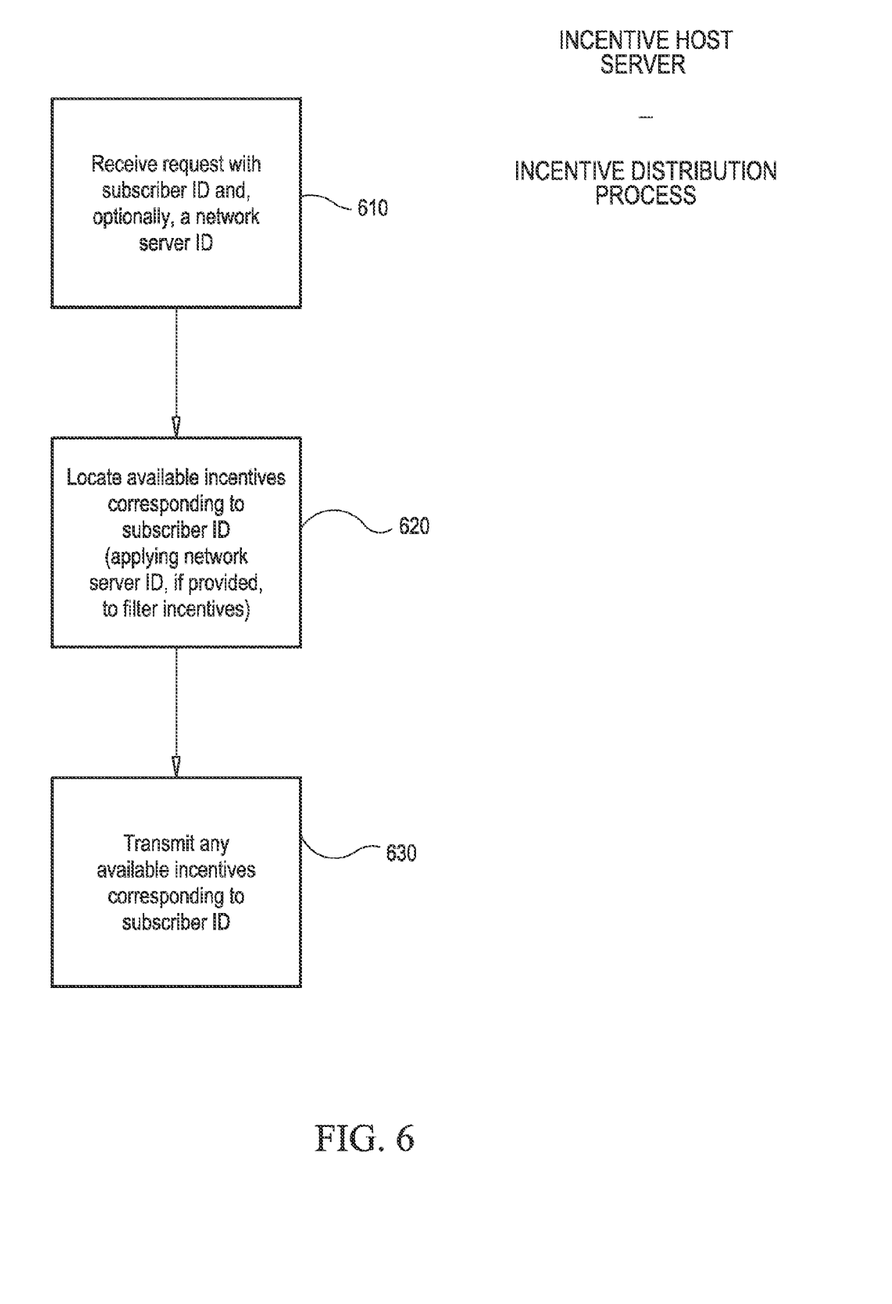
FIG. 6 is a flow chart of the steps performed by an incentive host server to facilitate distributed access to incentives in a manner consistent with the principles of the present invention.

FIG. 6 is a flow chart of the steps performed by the distribution process subsystem in a manner consistent with the present invention. After the incentive server receives a request from a server participating in the incentive network including a subscriber ID and optionally the Network Server ID (step 610), the incentive server locates information on any available incentives that are said to be "in the subscriber's account," i.e., stored in the incentive database and associated with the subscriber ID (step 620). When a Network Server ID is provided, the incentive server may also locate an exclusion or inclusion list for the identified server and apply the list to filter in or out specific incentives. Once the incentive information is located, and the optional filtering is performed, the incentive host server transmits the incentive information to the requesting incentive network server (step 630).

Account Creation

Figure 7:
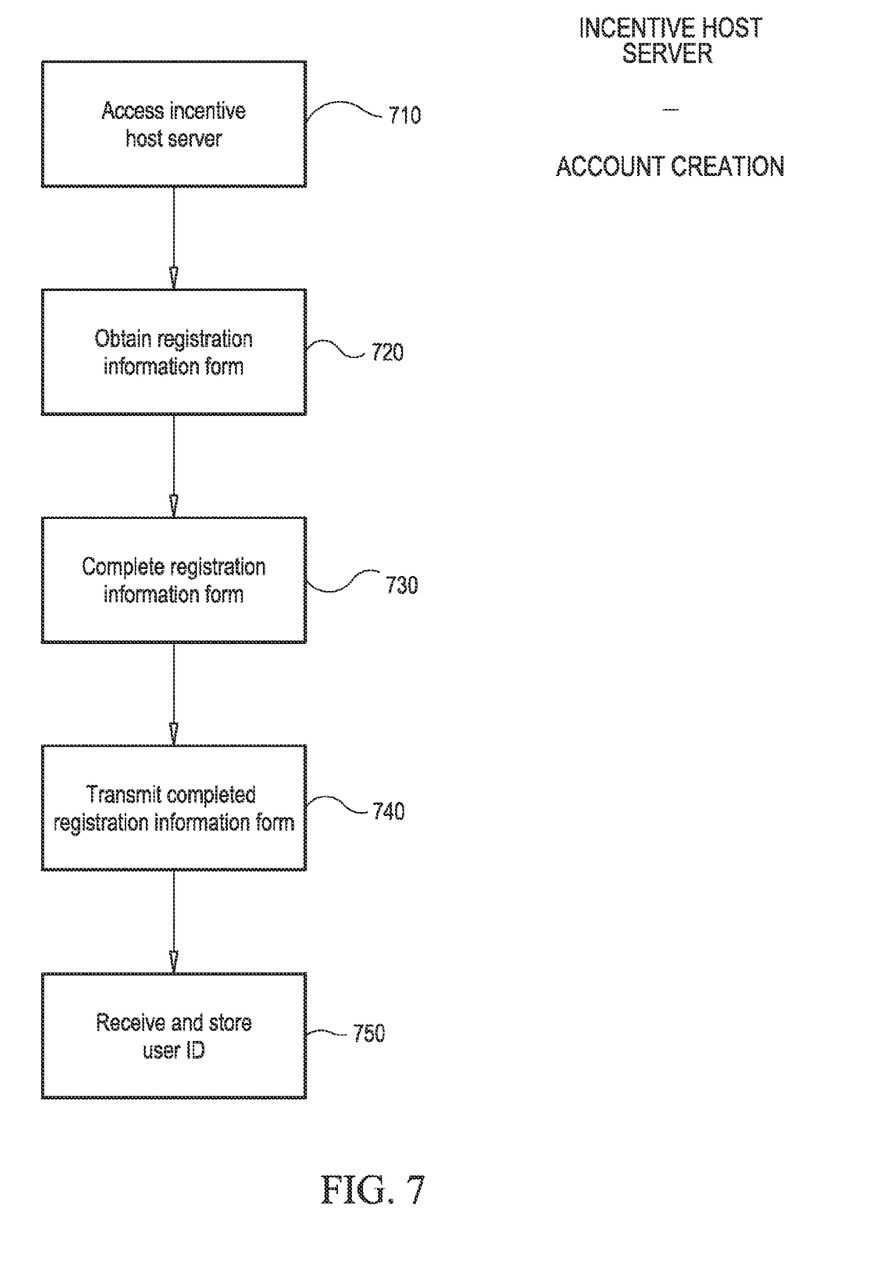
FIG. 7 is a flow chart of the steps performed by the incentive host server for creating subscriber accounts for incentives in a manner consistent with the principles of the present invention.

FIG. 7 is a flow chart of the steps performed by the incentive host server for creating subscriber accounts for incentives in a manner consistent with the principles of the present invention. In a process separate from the scheme outlined to provide network-wide access to incentives, the incentive host server provides a subsystem for creating subscriber accounts. As a first step in the process, a user accesses the incentive host server and indicates interest in subscribing to the incentive network (step 710). The server then transmits a registration form to the subscriber (step 720). Once the user completes the form (step 730) and transmits the completed form to the server (step 740), the server transmits a unique subscriber ID to the client system used in the account creation process and stores the ID on the client system for future use in accordance with the process described herein to distribute incentives on a network-wide basis. At a minimum, a subscriber's account information should include some identifier used to distinguish subscribers, for example, a electronic mail address. The account information may also include demographic and personal information corresponding to the subscriber.

Conclusion

An incentive network implemented in a manner consistent with the present invention thus facilitates network-wide access to incentive programs. By providing in each network server an access mechanism to the incentive server, client systems requesting documents from a network server are presented with information on selected incentives. For example, a consumer who frequents more than one general http site (often referred to as "Web portals") such as Yahoo.com and USAToday.com may access his/her available incentives through both those sites. This increases the consumer's exposure and access to the incentives without being intrusive. It also facilitates the provision of personalized information for the consumer on both sites without the need to create separate accounts on each site.

The foregoing description of an implementation of the invention has been presented for purposes of illustration and description. It is not exhaustive and does not limit the invention to the precise form disclosed. Modifications and variations are possible in light of the above teachings or may be acquired from practicing of the invention. For example, the described implementation includes software but the present invention may be implemented as a combination of hardware and software or in hardware alone. The invention may be implemented with both object-oriented and non-object-oriented programming systems. Additionally, although aspects of the present invention are described as being stored in memory, one skilled in the art will appreciate that these aspects can also be stored on other types of computer-readable media, such as secondary storage devices, like hard disks, floppy disks, or CD-ROM; a carrier wave from the Internet or other propagation medium; or other forms of RAM or ROM. The scope of the invention is defined by the claims and their equivalents.

What is claimed is:

1. A computer-implemented method of providing incentive information, comprising:
   receiving, at a network server, an access request from a device associated with a user;
   transmitting from the network server, to an incentive host server, a first identifier associated with the access request and a network server identifier (NID) associated with the network server;
   receiving at the network server, from the incentive host server, incentive information corresponding to one or more available incentives, wherein the one or more available incentives were determined based at least on the first identifier and the NID; and transmitting from the network server, to the device, the incentive information.

2. The method of claim 1, wherein receiving the access request from the device, includes:

receiving a request for a document stored at least in part on the network server.

3. The method of claim 2, wherein the document comprises a web page.

4. The method of claim 1, further comprising:

determining whether the user has subscribed to receive the incentive information.

5. The method of claim 4, wherein determining whether the user has subscribed, includes:

transmitting from the network server, to the device, a subscriber request; and receiving at the network server, from the device, a response including the first identifier.

6. The method of claim 5, wherein the first identifier is stored in a cookie on the device.

7. The method of claim 1, wherein the first identifier corresponds to the device associated with the user.

8. The method of claim 1, wherein the first identifier corresponds to the user.

9. The method of claim 1, wherein the first identifier comprises a unique subscriber identifier.

10. The method of claim 1, wherein transmitting from the network server, to the device, the incentive information, comprises:

generating a document including the incentive information; and transmitting from the network server, to the device, the document.

11. The method of claim 10, wherein the document comprises a web page.

12. The method of claim 1, wherein the one or more available incentives include coupons.

13. The method of claim 1, wherein the one or more available incentives include discounts.

14. The method of claim 1, wherein the one or more available incentives include awards.

15. A system for providing incentive information, comprising:

a network server, the network server comprising a processor configured to:

receive an access request from a device associated with a user;

transmit, to an incentive host server, a first identifier associated with the access request and a network server identifier (NID) associated with the network server;

receive, from the incentive host server, incentive information corresponding to one or more available incentives, wherein the one or more available incentives were determined based at least on the first identifier and the NID; and transmit, to the device, the incentive information.

16. The system of claim 15, wherein the access request comprises a request for a document stored at least in part on the network server.

17. The system of claim 16, wherein the document comprises a web page.

18. The system of claim 15, wherein the processor is further configured to:

determine whether the user has subscribed to receive the incentive information.

19. The system of claim 18, wherein, to determine whether the user has subscribed, the processor is further configured to:

transmit from the network server, to the device, a subscriber request; and receive at the network server, from the device, a response including the first identifier.

20. The system of claim 19, wherein the first identifier is stored in a cookie on the device.

21. The system of claim 15, wherein the first identifier corresponds to the device associated with the user.

22. The system of claim 15, wherein the first identifier corresponds to the user.

23. The system of claim 15, wherein the first identifier comprises a unique subscriber identifier.

24. The system of claim 15, wherein to transmit from the network server, to the device, the incentive information, the processor is configured to:

generate a document including the incentive information; and transmit from the network server, to the device, the document.

25. The system of claim 24, wherein the document comprises a web page.

26. The system of claim 15, wherein the one or more available incentives include coupons.

27. The system of claim 15, wherein the one or more available incentives include discounts.

28. The system of claim 15, wherein the one or more available incentives include awards.

29. A computer-implemented method of providing incentive information, comprising:

receiving, at an incentive host server, a request from a network server including a first identifier and a network server identifier (NID) associated with the network server;

determining, at the incentive host server, one or more available incentives based at least on the first identifier and the NID; and transmitting from the incentive host server, to the network server, incentive information corresponding to the one or more available incentives.

30. The method of claim 29, further comprising:

storing incentives in a repository associated with the incentive host server.

31. The method of claim 29, further comprising:

receiving at the incentive host server, from a device associated with a user, a request to create an account;

transmitting from the incentive host server, to the device, a request for information to create an account;

receiving at the incentive host server, from the device, information to create an account in response to the transmitted request;

creating an account for the user;

determining a unique identifier to be associated with the created account; and transmitting from the incentive host server, to the device, the unique identifier to be stored on the device.

32. The method of claim 31, wherein transmitting from the incentive host server, to the device, a request for information to create an account, further comprises:

transmitting from the incentive host server, to the device, a registration form.

33. The method of claim 32, wherein receiving at the incentive host server, from the device, information to create an account in response to the transmitted request further comprises:

receiving at the incentive host server, from the device, information in response to the transmitted registration form.

34. The method of claim 31, wherein the account includes demographic information corresponding to the user.

35. The method of claim 31, wherein the account includes personal information corresponding to the user.

36. The method of claim 29, wherein the first identifier received at the incentive host server, from the network server, comprises an identifier that uniquely identifies a user.

37. The method of claim 29, wherein the first identifier received at the incentive host server, from the network server, comprises a unique subscriber identifier.

38. The method of claim 29, wherein the first identifier received at the incentive host server, from the network server, comprises an identifier that uniquely identifies a device associated with the user.

39. The method of claim 38, wherein the first identifier is stored in a cookie on the device.

40. The method of claim 29, further comprising:
transmitting from the incentive host server, to a user device associated with the first identifier, the incentive information corresponding to the one or more available incentives.

41. The method of claim 29, wherein the one or more available incentives include coupons.

42. The method of claim 29, wherein the one or more available incentives include discounts.

43. The method of claim 29, wherein the one or more available incentives include awards.

44. A system for providing incentive information, comprising:
an incentive host server, the incentive host server comprising a processor configured to:
receive a request from a network server including a first identifier and a network server identifier (NID) associated with the network server;
determine one or more available incentives based at least on the first identifier and the NID; and
transmit, to the network server, incentive information corresponding to the one or more available incentives.

45. The system of claim 44, further comprising:
a repository associated with the incentive host server for storing incentives.

46. The system of claim 44, wherein the processor is further configured to:
receive at the incentive host server, from a device associated with a user, a request to create an account;
transmit from the incentive host server, to the device, a request for information to create an account;
receive at the incentive host server, from the device, information to create an account in response to the transmitted request;
create an account for the user;
determine a unique identifier to be associated with the created account; and
transmit from the incentive host server, to the device, the unique identifier to be stored on the device.

47. The system of claim 46, wherein, to transmit from the incentive host server, to the device, a request for information to create an account, the processor is further configured to:
transmit from the incentive host server, to the device, a registration form.

48. The system of claim 47, wherein the processor is further configured to:
receive at the incentive host server, from the device, information in response to the transmitted registration form.

49. The system of claim 46, wherein the account includes demographic information corresponding to the user.

50. The system of claim 46, wherein the account includes personal information corresponding to the user.

51. The system of claim 44, wherein the first identifier received at the incentive host server, from the network server, comprises an identifier that uniquely identifies a user.

52. The system of claim 44, wherein the first identifier received at the incentive host server, from the network server, comprises a unique subscriber identifier.

53. The system of claim 44, wherein the first identifier received at the incentive host server, from the network server, comprises an identifier that uniquely identifies a device associated with the user.

54. The system of claim 53, wherein the first identifier is stored in a cookie on the device.

55. The system of claim 44, wherein the processor is further configured to:
transmit from the incentive host server, to a user device associated with the first identifier, the incentive information corresponding to the one or more available incentives.

56. The system of claim 44, wherein the one or more available incentives include coupons.

57. The system of claim 44, wherein the one or more available incentives include discounts.

58. The system of claim 44, wherein the one or more available incentives include awards.

59. A computer-implemented method of providing incentive information, comprising:
receiving, at an incentive host server, registration information from a device associated with a user;
transmitting from the incentive host server, to the device, a Unique ID (UID);
receiving at the incentive host server, from a network server of a plurality of network servers, a request for incentives, the request for incentives including an associated UID and network server identifier (NID) associated with the network server;
determining, at the incentive host server, one or more available incentives based at least on the UID and the NID; and
transmitting from the incentive host server, to the device, incentive information corresponding to the one or more available incentives.

* * * * *